United States Patent
Ikeda et al.

(10) Patent No.: US 7,845,802 B2
(45) Date of Patent: Dec. 7, 2010

(54) ILLUMINATION APPARATUS AND PROJECTION DISPLAY APPARATUS

(75) Inventors: Takashi Ikeda, Higashi-Osaka (JP); Makoto Maeda, Osaka (JP); Ken Mashitani, Neyagawa (JP); Hideyuki Kanayama, Uji (JP)

(73) Assignee: Sanyo Electric Co., Ltd, Moriguchi-shi (JP)

( * ) Notice: Subject to any disclaimer, the term of this patent is extended or adjusted under 35 U.S.C. 154(b) by 496 days.

(21) Appl. No.: 11/934,818

(22) Filed: Nov. 5, 2007

(65) Prior Publication Data
US 2008/0106700 A1    May 8, 2008

(30) Foreign Application Priority Data
Nov. 6, 2006    (JP) ............................. 2006-300388

(51) Int. Cl.
*G03B 21/00* (2006.01)

(52) U.S. Cl. .............................. 353/31; 353/20; 353/33; 353/81; 353/98; 353/99; 353/30; 353/8; 353/37; 353/84; 353/122; 359/237; 359/242; 359/464; 359/465; 359/462; 348/750; 348/744; 348/751; 348/E9.027; 348/742; 348/743; 348/771; 349/5; 349/7; 349/8; 349/9

(58) Field of Classification Search ............... 353/20, 353/31, 33, 81, 98, 99, 122, 84, 30, 8, 37; 359/462, 464, 465, 502, 483, 490, 501, 70, 359/63, 237, 242; 348/744, 751, E9.027, 348/742, 743, 771; 349/5, 7, 8, 9
See application file for complete search history.

(56) References Cited

U.S. PATENT DOCUMENTS

| | | | | |
|---|---|---|---|---|
| 4,461,542 A * | 7/1984 | Gagnon | ......................... | 349/8 |
| 5,237,435 A * | 8/1993 | Kurematsu et al. | ............. | 349/8 |
| 6,330,112 B1 * | 12/2001 | Kaise et al. | .................. | 359/621 |
| 6,980,176 B2 * | 12/2005 | Matsumoto et al. | ............ | 345/6 |
| 7,221,332 B2 * | 5/2007 | Miller et al. | ..................... | 345/32 |
| 7,241,014 B2 * | 7/2007 | Lippey et al. | .................. | 353/8 |
| 7,438,419 B2 * | 10/2008 | Yamamoto | .................... | 353/20 |
| 2008/0259224 A1 * | 10/2008 | Roth | ........................... | 348/750 |

FOREIGN PATENT DOCUMENTS

JP    2002-287247    10/2002

\* cited by examiner

*Primary Examiner*—Georgia Y Epps
*Assistant Examiner*—Sultan Chowdhury
(74) *Attorney, Agent, or Firm*—Marvin A. Motsenbocker; Mots Law, PLLC

(57) ABSTRACT

An illumination apparatus includes a plate-like separation optical element having a dichroic surface and a PBS surface. The dichroic surface reflects green component light and transmits yellow component light. The PBS surface transmits P polarization component light and reflects S polarization component light. The separation optical element combines red component light entering from a certain direction and transmitted through the dichroic surface, with yellow component light entering from a different direction and reflected by the PBS surface, and leads a combined light towards a red liquid crystal panel. The separation optical element combines green component light entering from the certain direction and reflected by the dichroic surface, with yellow component light entering from the different direction and transmitted through the PBS surface, and leads a combined light towards a green liquid crystal panel.

6 Claims, 10 Drawing Sheets

| DISPLAY COLOR | PATTERN 1 | PATTERN 2 | PATTERN 3 |
|---|---|---|---|
| R | R+Ye-s | R | R+Ye |
| G | G+Ye-p | G+Ye | G |
| B | B | B | B |
| W | R+G+B+Ye | R+G+B+Ye | R+G+B+Ye |

ILLUMINATION APPARATUS AND PROJECTION DISPLAY APPARATUS

CROSS REFERENCE TO RELATED APPLICATION

This application is based upon and claims the benefit of priority from prior Japanese Patent Application No. 2006-800388, filed on Nov. 6, 2006; the entire contents of which are incorporated herein by reference.

BACKGROUND OF THE INVENTION

1. Field of the Invention

The present invention relates to an illumination apparatus and projection display apparatus each utilizing fourth color component light in addition to red component light, green component light and blue component light.

2. Description of Related Art

Heretofore, there has been known a projection display apparatus including three light valves corresponding to three color light beams, a cross dichroic cube for combining light beams outputted from the three light valves, and a projector for projecting a light beam combined by the cross dichroic cube.

Here, the cross dichroic cube has three light incident surfaces which light enters and one light-outputting surface from which light is outputted. Accordingly, when light beams entering the cross dichroic cube are of three colors, a projection display device only needs one cross dichroic cube.

On the other hand, there has been also proposed a projection display device that utilizes light beams of four or more colors in order to improve color reproducibility and luminance. A projection display device utilizes, for example, orange, yellow or cyan in addition to three colors of red, green and blue, so that color reproducibility and luminance is improved refer to Japanese Patent Publication No. 2002-287247 (claims 1 and 4, FIG. 1, and the like), for example).

In a case where a projection display device uses light beams of four or more colors, the light beams of four or more colors cannot be combined by one cross dichroic cube. Accordingly, the projection display device is required to have a plurality of dichroic cubes (or cross dichroic cubes).

In a case where four color light beams need to be combined, for example, the projection display device obtains two combined light beams each composed of two color light beams, and further combines the two combined light beams to obtain a combined light beam of four color light beams. Incidentally, the projection display device may obtain a combined light beam of four color light beams by obtaining a combined light beam of three color light beams, and then by combining the obtained combined light beam with the remaining one color light beam. Instead, the projection display device may obtain a combined light beam of four color light beams by obtaining a combined light beam of two color light beams, and then by combining the combined light beam with the remaining two color light beams.

Here, the lengths of the optical paths from the light valves corresponding to the respective light beams of four or more colors to the projector need to be the same. In addition, a plurality of dichroic cubes (or of cross dichroic cubes) need to be provided between the light valves and the projector. This requires a projector to have a long back focus.

As a result, the projector used in the projection display apparatus that utilizes three color light beams cannot be used for another type of projection display apparatus that utilizes four or more color light beams. Accordingly, the entire costs for the projection display apparatus increase.

SUMMARY OF THE INVENTION

In a first aspect of the present invention, an illumination apparatus provided with a first polarization conversion element (PBS array 30) configured to align polarization directions of first color component light (blue component light), second color component light (green component light), third color component light (red component light), and fourth color component light (yellow component light). The illumination apparatus is provided with: a first light valve (liquid crystal panel 40B) configured to modulate the first color component light; a second light valve (liquid crystal panel 40G) configured to modulate at least the second color component light; a third light valve (liquid crystal panel 40R) configured to modulate at least the third color component light; and a fourth light valve (polarization rotation element 45) configured to rotate a polarization direction of the fourth color component light. The illumination apparatus is provided with a color combining unit (cross dichroic cube 50) configured to combine the first color component light outputted from the first light valve, output light including at least the second color component light outputted from the second light valve, and output light including at least the third color component light outputted from the third light valve. The illumination apparatus includes: a first separation optical element of plate-like shape (separation optical element 80) having a first dichroic surface (dichroic surface 81) and a first polarization separation surface (PBS surface 82). The first dichroic surface is configured to reflect the second color component light and to transmit the third color component light. The first polarization separation surface is configured to transmit polarization component light having a certain polarization direction and to reflect polarization component light having a different polarization direction perpendicular to the certain polarization direction. In the illumination apparatus, the second color component light and the third color component light, the polarization directions of which have been aligned by the first polarization conversion element, enter the first separation optical element from a certain direction, and the fourth color component light, the polarization of which has been rotated by the fourth light valve, enters the first separation optical element from a different direction. In the illumination apparatus, the first separation optical element combines the third color component light entering the first dichroic surface from the certain direction and transmitted through the first dichroic surface, with the fourth component light entering the first polarization separation surface from the different direction and reflected by the first polarization separation surface. The first separation optical element then leads a combined light towards the third light valve. In the illumination apparatus, the first separation optical element combines the second color component light entering the first dichroic surface from the certain direction and reflected by the first dichroic surface, with the fourth color component light entering the first polarization separation surface from the different direction and transmitted through the first polarization separation surface. The first separation optical element then leads a combined light towards the second light valve.

According to the first aspect of the invention, the fourth color component light outputted from the fourth light valve enters any one of or both of the second light valve and the third light valve. Specifically, the fourth color component light is superposed on any one of or both of the second color component light and the third component light, and then the light is provided to the color combining unit. Accordingly, in a case where the fourth color component light is utilized in addition to the first color component light, the second color component light, and the third color component light, types of colors of light beams entering the color combining unit are three types. As a result of this, designing of a projector does not have to be changed and thereby, it is possible to suppress an increase of entire costs for the apparatus.

In addition, since the fourth color component light is superposed on any one of or both of the second color component light and the third color component light and then projected, the luminance of an image projected on a screen or the like improves.

Here, the length of the optical path from the fourth valve to the projector is different from the lengths of the optical paths from the first, second, and third light valves till the projector. In the meantime, since the light outputted from the fourth light valve is used as illumination light, it is not necessary to view an influence by the difference in the optical paths as a problem.

Moreover, the first separation optical element combines the third color component light transmitted through the first dichroic surface with the fourth color component light reflected by the first polarization separation surface. The first separation optical element then leads the combined light towards the third light valve. In addition, the first separation optical element combines the second color component light reflected by the first dichroic surface with the fourth color component light transmitted through the first polarization separation surface. The first separation optical element then leads the combined light towards the second light valve. Furthermore, the fourth light valve rotates the polarization direction of the fourth color component light, whose polarization direction has been aligned.

Accordingly, it is possible to selectively switch from one another whether to disperse the fourth color component light beam and then superpose the dispersed fourth color component light beams on the second color component light beam and the third color component light beam, to superpose the fourth color component light beam only on the second color component light beam, or to superpose the fourth color component only on the third color component light beam.

Thereby, the luminance of white color reproduced by the first to fourth color component light beams can be improved while maintaining the purities of the colors reproduced by the first to fourth component light beams.

In the first aspect of the present invention, the illumination apparatus further includes a second separation optical element of plate like shape (separation optical element 80b) having a second dichroic surface (dichroic surface 81b) and a second polarization separation surface (PBS surface 82b). The second dichroic surface is configured to reflect the third color component light and to transmit the fourth color component light. The second polarization surface is configured to transmit polarization component light of the certain polarization direction and to reflect polarization component light of the different polarization direction. The fourth color component light from the certain direction enters the first separation optical element in addition to the second color component light and the third color component light. The second separation optical element transmits the fourth color component light transmitted through the first separation optical element and leads the light towards the fourth light valve. In addition, the second separation optical element reflects the third color component light transmitted through the first separation optical element and the fourth color component light reflected by the first separation optical element, and leads the light towards the third light valve.

In the first aspect of the present invention, the illumination apparatus further includes a second polarization conversion element (polarization rotation element 46). The second polarization conversion element is configured to align the polarization direction of the third color component light transmitted through the first dichroic surface and the polarization direction of the fourth color component light reflected by the first polarization surface.

In the first aspect of the present invention, a resolution of the fourth light valve is lower than a resolution of each of the first, second and third light valves.

In the first aspect of the present invention, the illumination apparatus further includes a rotation amount controller (modulation amount controller 220). The rotation amount controller is configured to control a rotation amount of the polarization direction of the fourth color component light rotated by the fourth light valve, on the basis of input signals for first, second and third colors respectively corresponding to the first color component light, the second color component light, and the third color component light, the rotation being performed by the fourth light valve.

In a second aspect of the present invention, a projection display apparatus includes the illumination apparatus of the first aspects.

DETAILED DESCRIPTION OF EMBODIMENTS

Figure 1:
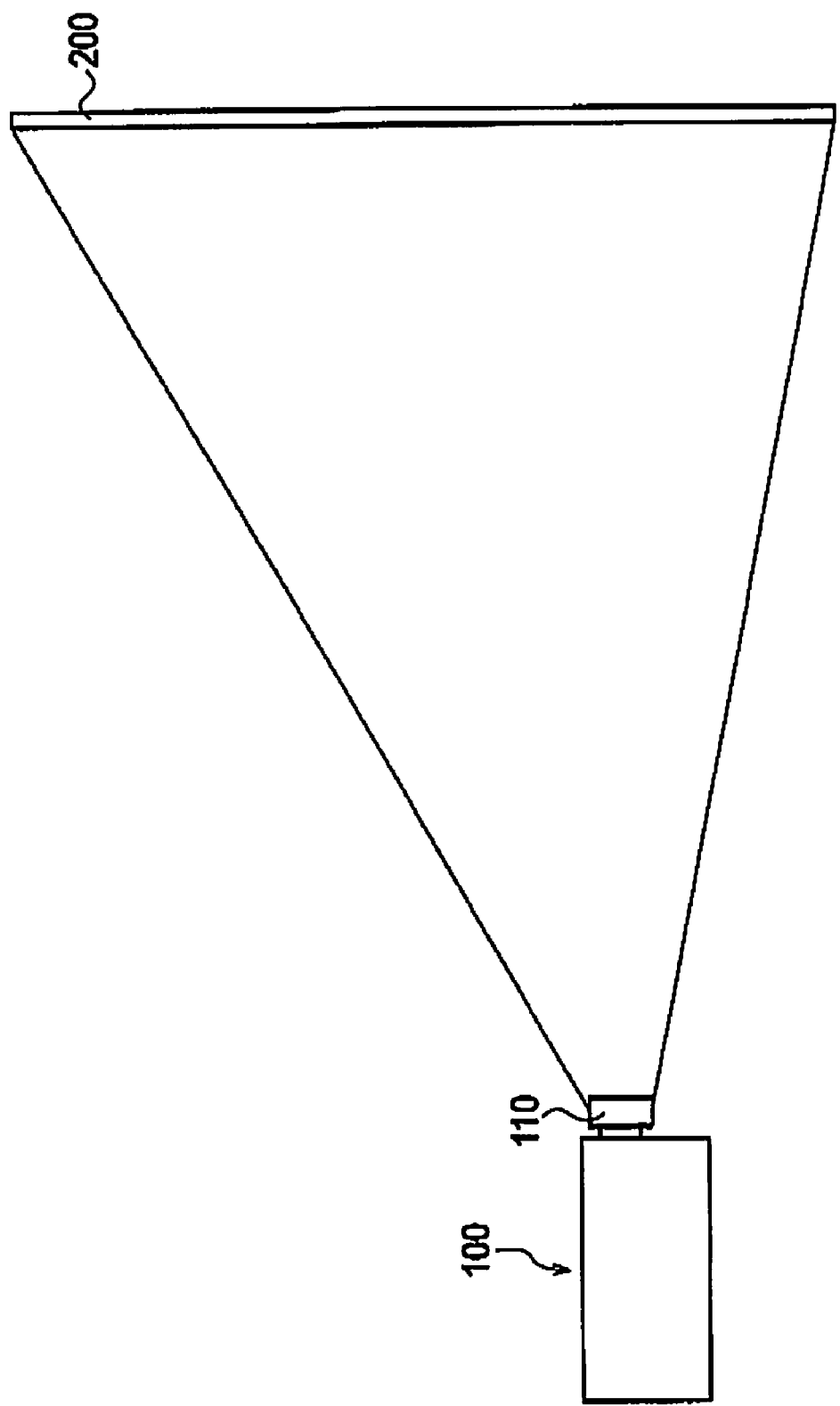
FIG. 1 is a diagram schematically showing a projection display apparatus 100 according to a first embodiment.

Hereinafter, descriptions will be given of a projection display apparatus according to embodiments of the present invention with reference to drawings. It should be noted that same or similar reference numerals are given to denote same or similar portions in the drawings.

In addition, the drawings are merely schematically shown and proportions of sizes and the like are different from actual ones. Specific sizes and the like should be thus judged by referring to the description below. In addition, as a matter of course, there are included portions where relationships or proportions of sizes of the drawings are different with respect to one another.

First Embodiment (Overview of Projection Display Apparatus)

Hereinafter, a description will be given of an overview of a projection display apparatus according to a first embodiment with reference to a drawing. FIG. 1 is a diagram showing an overview of a projection display apparatus 100 according to the first embodiment.

As shown in FIG. 1, a projection display apparatus 100 includes a projection lens unit 110 and projects image light enlarged by the projection lens unit 110 onto a screen 200. It should be noted that in the first embodiment, the projection display apparatus 100 uses red component light as third color component light, green component light as second color component light, and blue component light as first color component light, as will be described later. In addition, it should be noted that the projection display apparatus 100 uses yellow component light as fourth color component light.

(Schematic Configuration of Illumination Unit)

Figure 2:
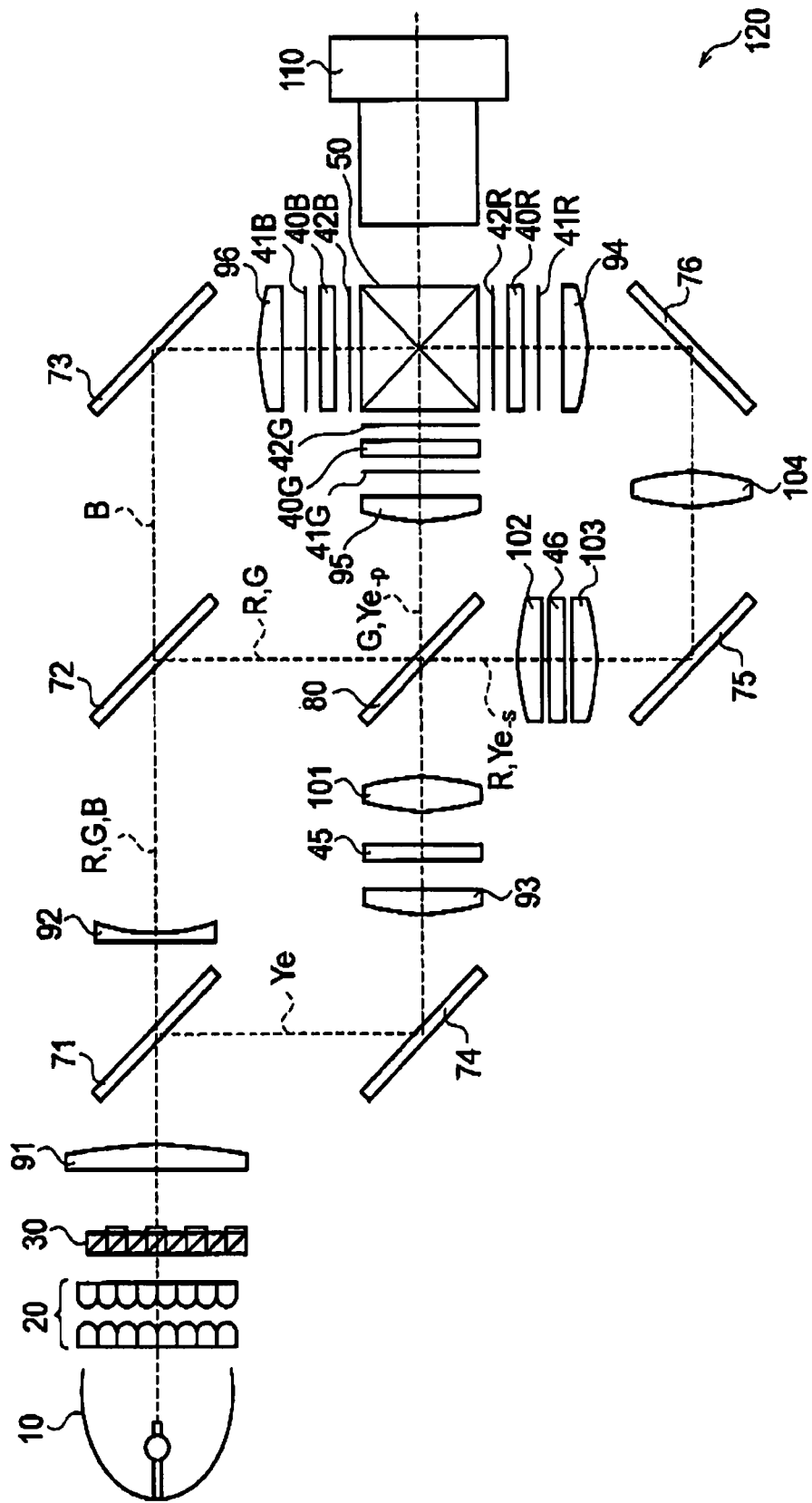
FIG. 2 is a diagram showing a schematic configuration of an illumination unit 120 according to the first embodiment.

Hereinafter, a description will be given of a schematic configuration of an illumination unit according to the first embodiment with reference to a drawing. FIG. 2 is a diagram showing a schematic configuration of an illumination unit 120 according to the first embodiment.

As shown in FIG. 2, the illumination unit 120 includes a light source 10, a fly-eye integrator 20, a PBS array 30, a plurality of liquid crystal panels 40 (liquid crystal panels 40R, 40G and 40B), a polarization rotation element 45, a polarization rotation element 46 and a cross dichroic cube 50. Incidentally, it should be noted that although the projection lens unit 110 is illustrated in FIG. 2, the projection lens unit 110 is not included in the illumination unit 120.

The light source 10 is an UHP lamp or the like, which emits white color light. Specifically, the light emitted from light source 10 includes at least red component light, green component light, blue component light and yellow component light.

Figure 3:
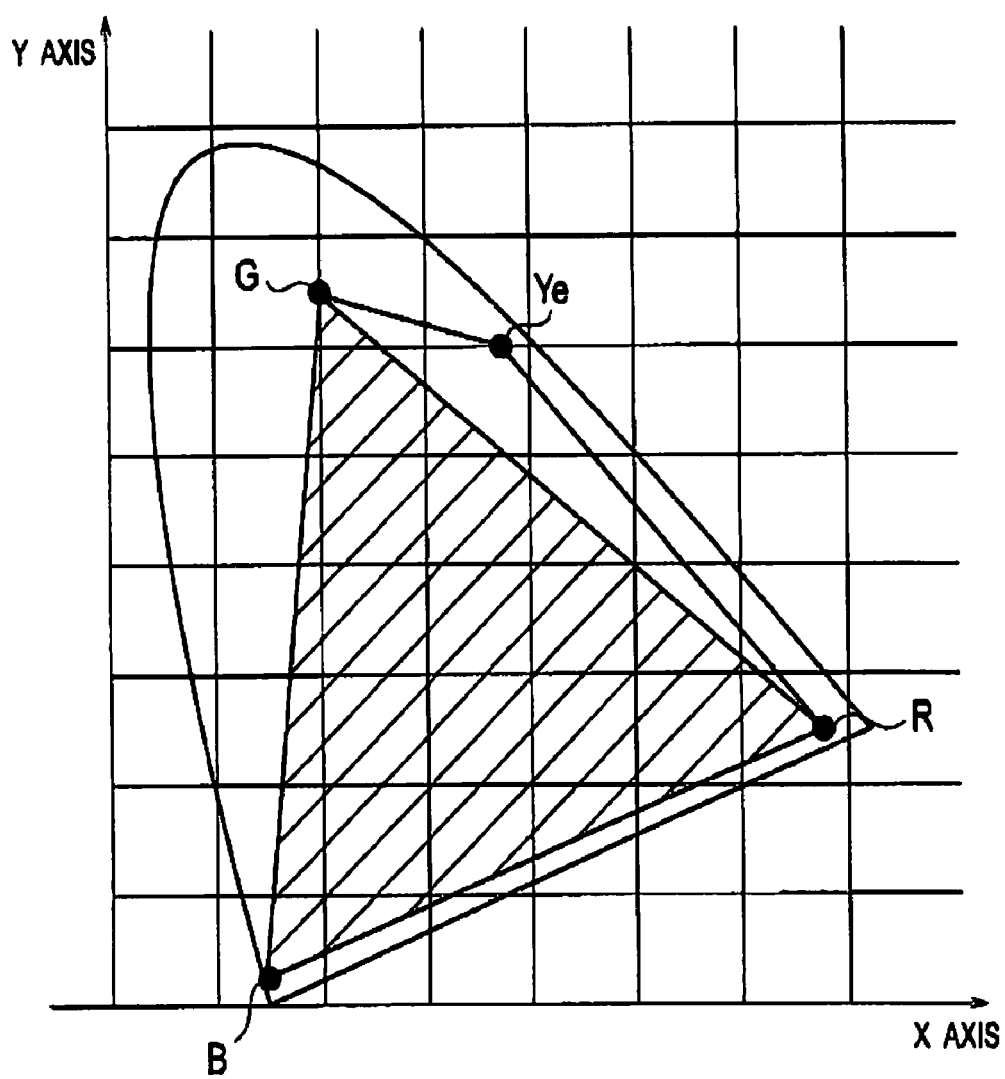
FIG. 3 is a diagram showing an RGB color reproduction range according to the first embodiment.

Here, as shown in FIG. 3, the yellow component light is capable of reproducing a color outside of a color reproduction range (RGB color reproduction range) of a color that can be reproduced by red component light, green component light and blue component light. In the projection display apparatus using three color light beams, yellow component light is removed during a color separation process.

The fly-eye integrator 20 is configured of pairs of optical elements including fine lenses arranged in an array shape. The fly-eye integrator 20 homogenizes light beams emitted from the light source 10.

The PBS array 30 is configured of PBS layers film or ½λ retarders. The PBS array 30 aligns polarization directions of light beams emitted from the light source 10 in a single polarization direction (here, P polarization direction).

The liquid crystal panel 40R modulates red component light (and yellow component light) in accordance with the amount of modulation controlled on the basis of input signals for red and green. A polarizing plate 41R configured to transmit light having a certain polarization direction (here, P polarization component light) and to shield light having a different polarization direction (here, S polarization component light) is provided on a light-entering side of the liquid crystal panel 40R. On the other hand, a polarizing plate 42R configured to transmit light having the different polarization direction (here, S polarization direction) and to shield light having the certain polarization direction (here, P polarization direction) is provided on a light-outputting side of the liquid crystal panel 40R.

It should be noted that P polarization direction is a polarization direction in which light entering a separation optical element 80 (which will be described later) becomes P polarization component light, and light entering a different light incident surface is not taken into consideration. Likewise, S polarization direction is a polarization direction in which light entering the separation optical element 80 (which will be described later) becomes S polarization component light, and light entering a different light incident surface is not taken into consideration.

The liquid crystal panel 40G modulates green component light (and yellow component light) in accordance with the amount of modulation controlled on the basis of input signals for green and red. A polarization plate 41G configured to transmit light having a certain polarization direction and to shield light having a different polarization direction is provided on a light incident surface of the liquid crystal panel 40G. On the other hand, a polarizing plate 42G configured to transmit light having the different polarization direction and to shield light having the certain polarization direction is provided to a light-outputting side of the liquid crystal panel 40G.

The liquid crystal panel 40B modulates a blue component light in accordance with the amount of modulation controlled on the basis of an input signal for blue. A polarizing plate 41B configured to transmit light having a certain polarization direction and to shield light having a different polarization direction is provided on a light-entering side of the liquid crystal panel 40B. On the other hand, a polarizing plate 42B configured to transmit light having the different polarization direction and to shield light having the certain polarization direction is provided to a light-outputting side of the liquid crystal panel 40B.

The polarization rotation element 45 rotates yellow component light in accordance with a control signal calculated on the basis of input signals for red, green and blue. Here, it should be noted that a rotation amount of yellow component light in a polarization direction is controlled on the basis of the input signals for red, green and blue.

The polarization rotation element 46 aligns the polarization direction (P polarization direction) of the red component light transmitted through the separation optical element 80 (which will be described later) and the polarization direction (S polarization direction) of the yellow component light reflected by the separation optical element 80 in a single polarization direction. Specifically, the polarization rotation element 46 converts the yellow component light into P polarization component light by rotating the polarization direction of the yellow component light at 90°.

Here, it should be noted that the polarization rotation element 46 may be provided on an optical path of the red component having yellow component light superposed thereon, the optical path being anywhere from the separation optical element 80 till the liquid crystal panel 40R.

The illumination unit 120 includes a plurality of mirrors (mirrors 71 to 76), the separation optical element 80, and a plurality of lenses (lenses 91 to 96 and lenses 101 to 104).

The mirror 71 is a dichroic mirror configured to transmit red component light, green component light and blue component light and to reflect yellow component light. The mirror 72 is a dichroic minor configured to transmit blue component light and to reflect red component light and green component light. The mirror 73 is a reflection mirror configured to reflect a blue component light and to lead the light towards the liquid crystal panel 40B. The mirror 74 is a reflection mirror configured to reflect yellow component light and to lead the light towards the polarization rotation element 45. The mirrors 75 and 76 are reflection mirrors each configured to reflect the red component light transmitted through the separation optical element 80 and the yellow component light reflected by the separation optical element 80 and to lead the light towards the liquid crystal panel 40R.

Figures 4, 5:
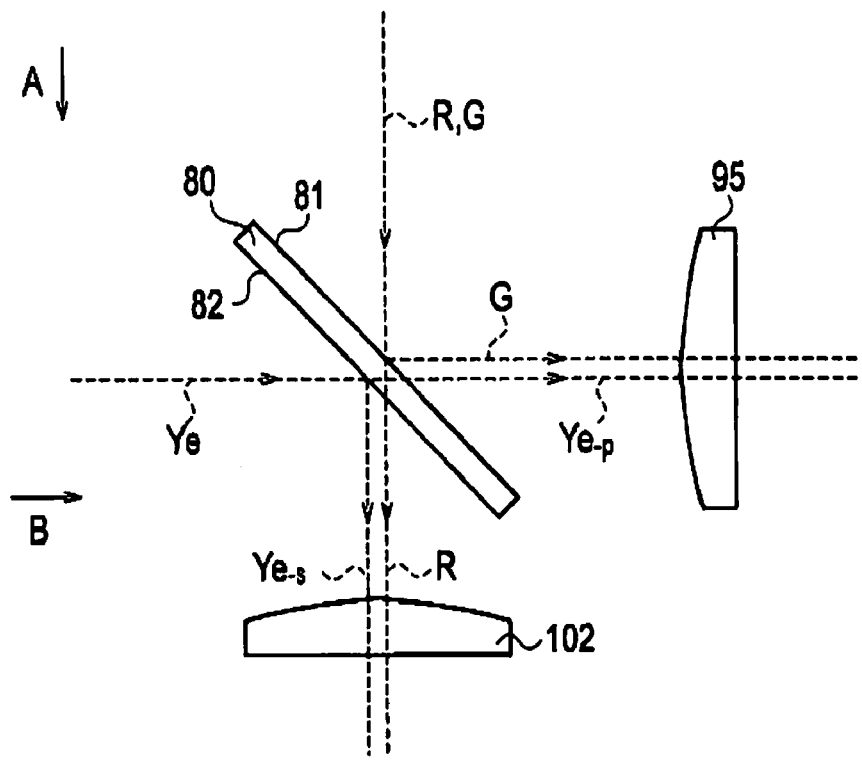
FIG. 4 is a diagram showing a configuration of a separation optical element according to the first embodiment.
FIG. 5 is a diagram provided for describing a method of superposing yellow component light according to the first embodiment.

As shown in FIG. 4, the separation optical element 80 is a plate-like element including a dichroic surface 81 and a PBS surface 82 formed thereon. The dichroic surface 81 reflects green component light and transmits red component light. The PBS surface 82 transmits P polarization component light and reflects S polarization component light. Red component light and green component light each having P polarization direction enters the separation optical element 80 from a certain direction (direction A in FIG. 4). Then, yellow component light whose polarization direction is rotated by the polarization rotation element 45 enters the separation optical element 80 from a different direction (direction B in FIG. 4).

Accordingly, the green component light entering from direction A is reflected by the dichroic surface 81 and then led towards the lens 95 (towards the liquid crystal panel 40G). On the other hand, the red component light (P polarization component light) entered from direction A is transmitted through the dichroic surface 81 and PBS surface 82 and then led towards the lens 102 (towards the liquid crystal panel 40R).

Among the yellow component light beams entered from direction B, a yellow component light beam having P polarization direction (Ye-$_P$) is transmitted through the PBS surface 82 and dichroic surface 81 and then led towards the lens 95 (towards the liquid crystal panel 40G). On the other hand, among the yellow component light beams entered from direction B, a yellow component light beam having S polarization direction (Ye-$_S$) is reflected by the PBS surface 82 and then led towards the lens 102 (towards the liquid crystal panel 40R).

Specifically, the separation optical element 80 combines the green component light entering from direction A and reflected by the dichroic surface 81 with the yellow component light (Ye-$_P$) entered from direction B and transmitted through the PBS surface 82, and then leads the combined light beam towards the lens 95 (towards the liquid crystal panel 40G). On the other hand, the separation optical element 80 combines the red component light entering from direction A and transmitted through the dichroic surface 81 with the yellow component light (Ye-$_S$) entered from direction B and reflected by the PBS surface 82, and then leads the combined light beam towards the lens 102 (towards the liquid crystal panel 40R).

As described above, the polarization rotation element 45 rotates a polarization direction of the yellow component light. The separation optical element 80 then separates the yellow component light while superposing a part of the yellow component light on green component light, and then superposing a different part of the yellow component light on the red component light.

The lenses 91 to 96 are condenser lenses that condense light emitted from the light source 10 for each of the liquid crystal panels 40. The lenses 101 to 104 are relay lenses provided for adjusting differences of optical path lengths of the respective color component light beams.

(Method of Superposing Yellow Component light)

Hereinafter, a description will be given of a method of superposing yellow component light according to the present embodiment with reference to drawings. FIGS. 5 to 8 are drawings provided for describing the method of superposing yellow component light according to the embodiment.

As shown in FIG. 5, as the method of superposing yellow component light, patterns 1 to 3 can be considered.

Specifically, in pattern 1, the polarization rotation element 45 rotates a polarization direction of yellow component light having P polarization direction, and thereby, yellow component light having S polarization direction is superposed on the red component light. Then, the yellow component light having P polarization direction is superposed on green component light.

Figure 6:
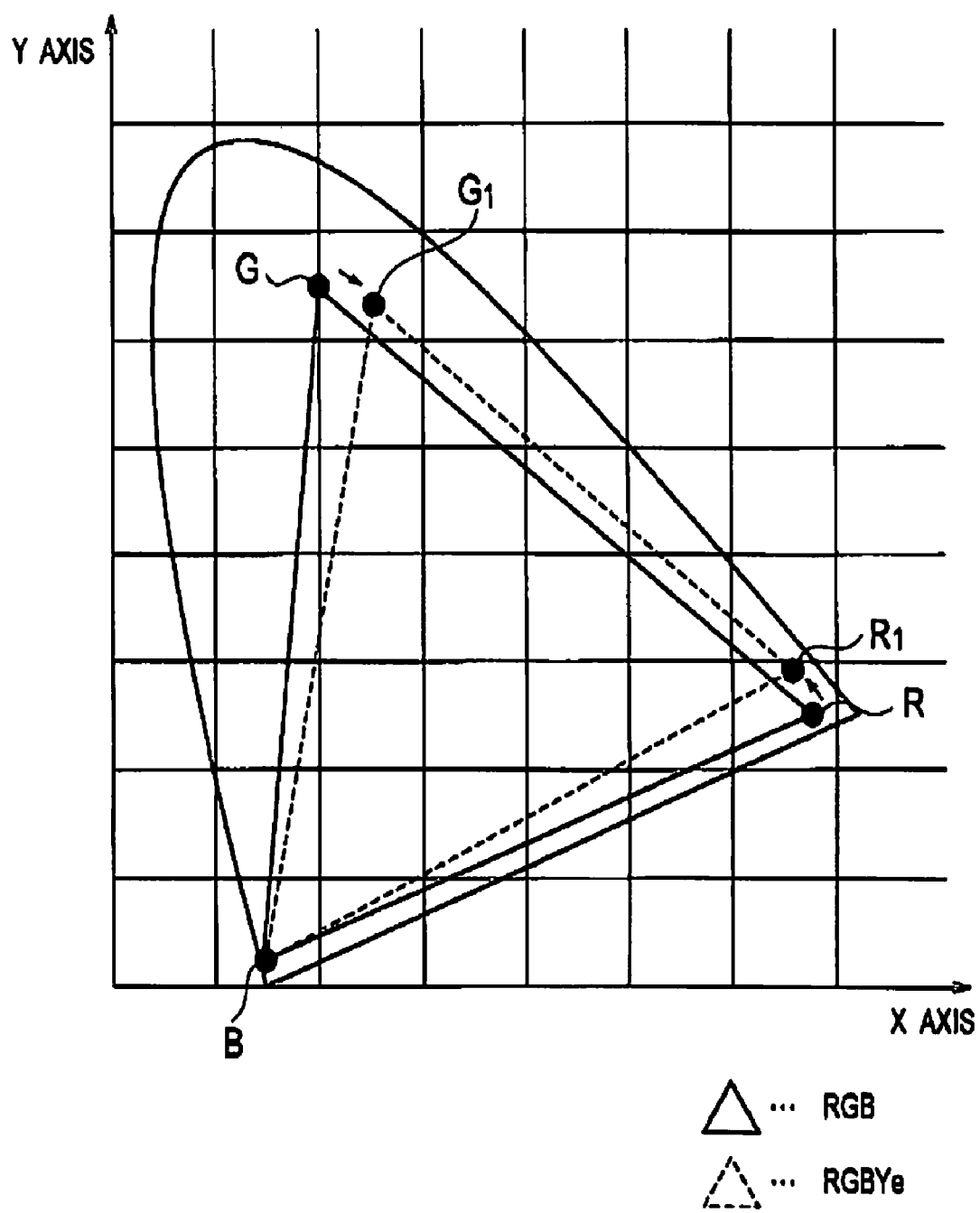
FIG. 6 is another diagram provided for describing a method of superposing yellow component light according to the first embodiment.

As shown in FIG. 6, since yellow component light having S polarization direction is superposed on red component light, red color (R1) reproduced by use of the yellow component light is shifted towards the yellow color as compared with red color (R) reproduced by use of three colors. Likewise, since yellow component light having P polarization direction is superposed on green component light, green color (G1) reproduced by use of the yellow component light is shifted towards the yellow color as compared with green color (G) reproduced by use of three colors.

In pattern 2, since the polarization rotation element 45 does not rotate a polarization direction of yellow component light having P polarization direction, the yellow component light is not superposed on red component light either. Accordingly, the yellow component light having P polarization direction is superposed on green component light.

Figure 7:
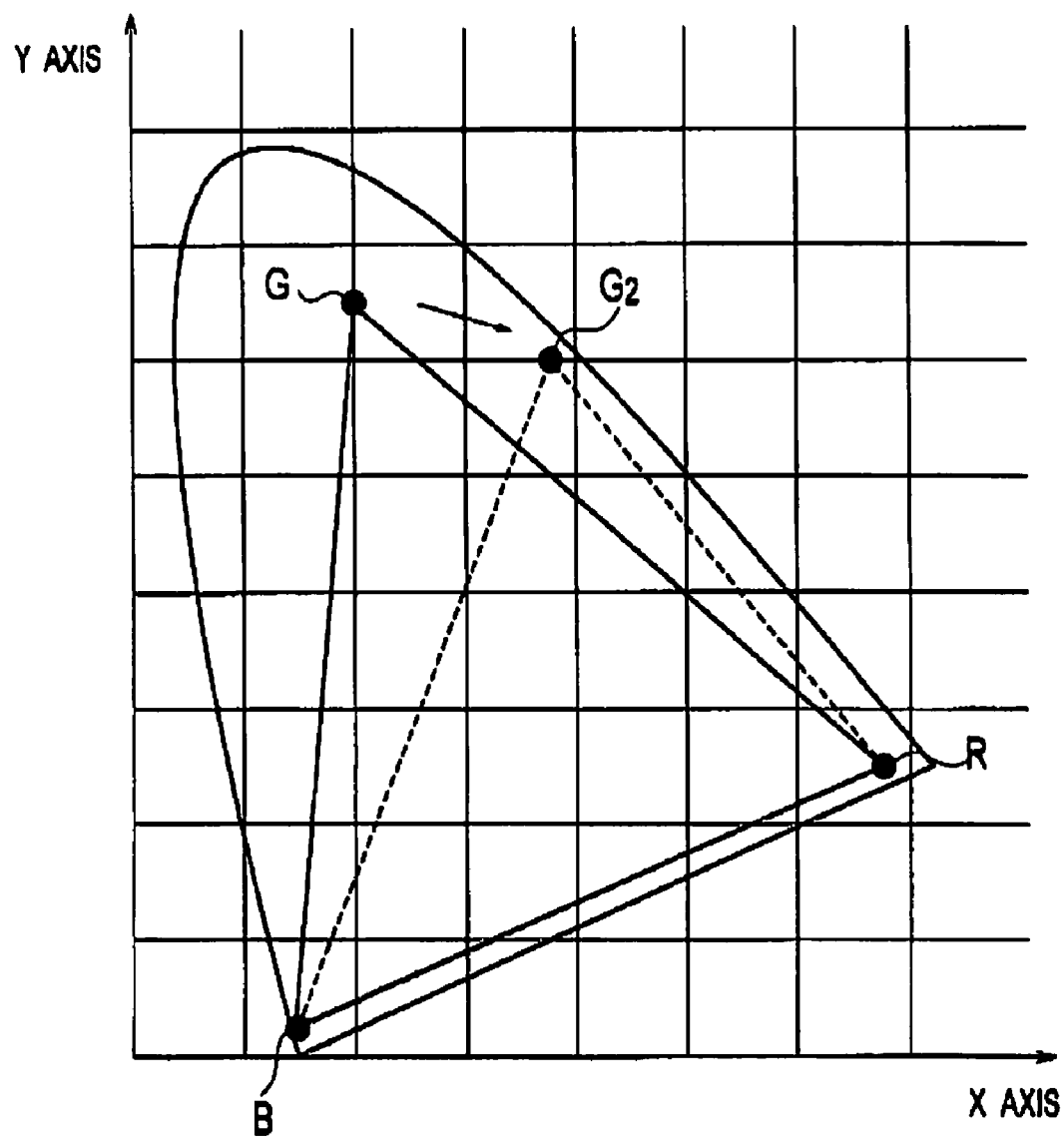
FIG. 7 is yet another diagram provided for describing a method of superposing yellow component light according to the first embodiment.

As shown in FIG. 7, since yellow component light is not superposed on red component light, red color (R) is not shifted towards the yellow color either. On the other hand, since all the yellow component light is superposed on green component light, green color (G2) reproduced by use of the yellow component light is shifted towards the yellow color to a large extent as compared with green color (G) reproduced by use of three colors.

In pattern 3, since the polarization rotation element 45 rotates a polarization direction of yellow component light having P polarization direction at 90°, the yellow component light is not superposed on green component light either. Accordingly, the yellow component light having S polarization direction is superposed on the red component light.

Figure 8:
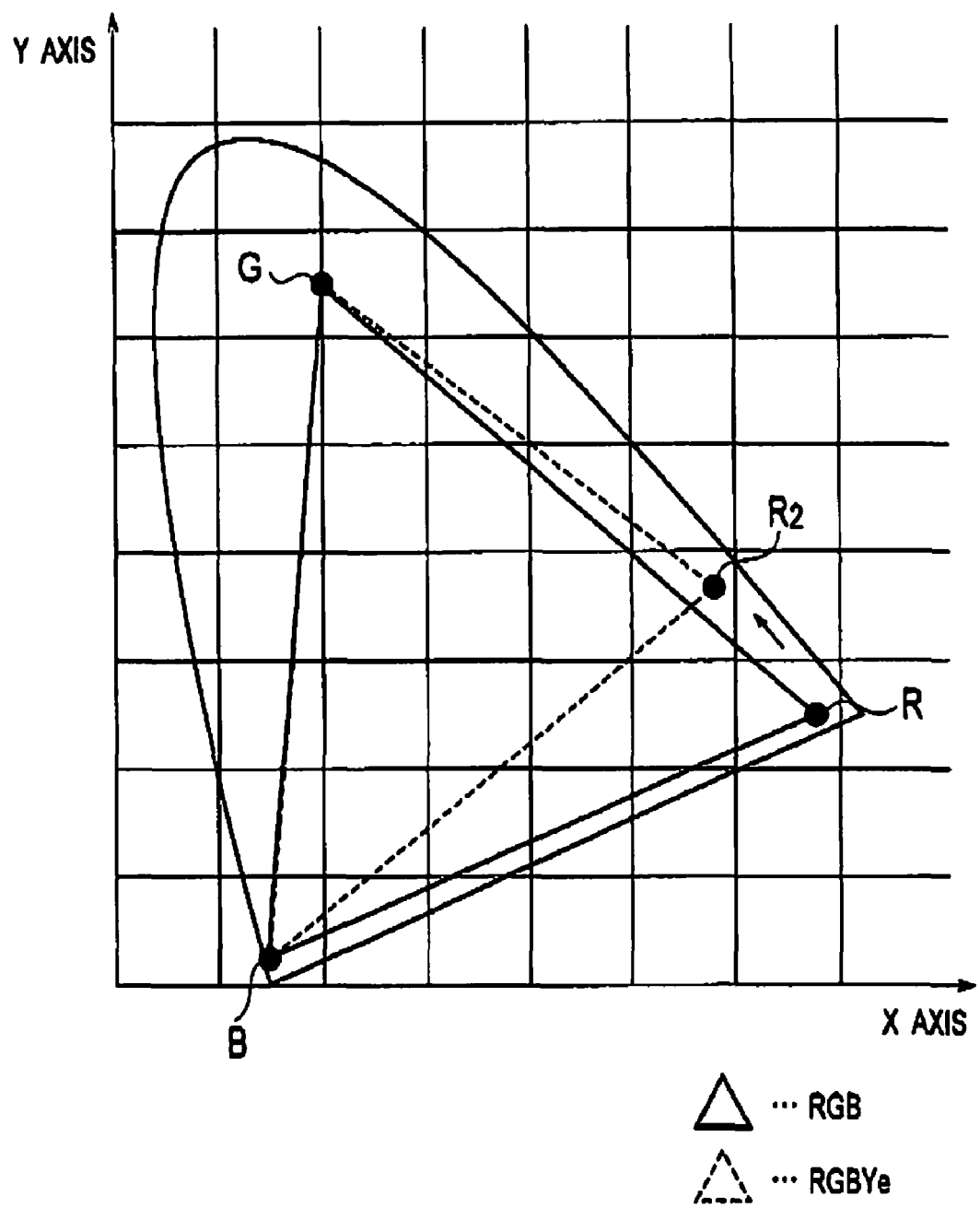
FIG. 8 is still another diagram provided for describing a method of superposing yellow component light according to the first embodiment.

As shown in FIG. 8, since the yellow component light is not superposed on the green component light, green color (G) is not shifted to the yellow color side either. On the other hand, since all the yellow component light is superposed over the red component light, red color (R2) reproduced by use of the yellow component light is shifted towards the yellow color to a large extent as compared with red color (R) reproduced by use of three colors.

(Functions of Projection Display Apparatus)

Figure 9:
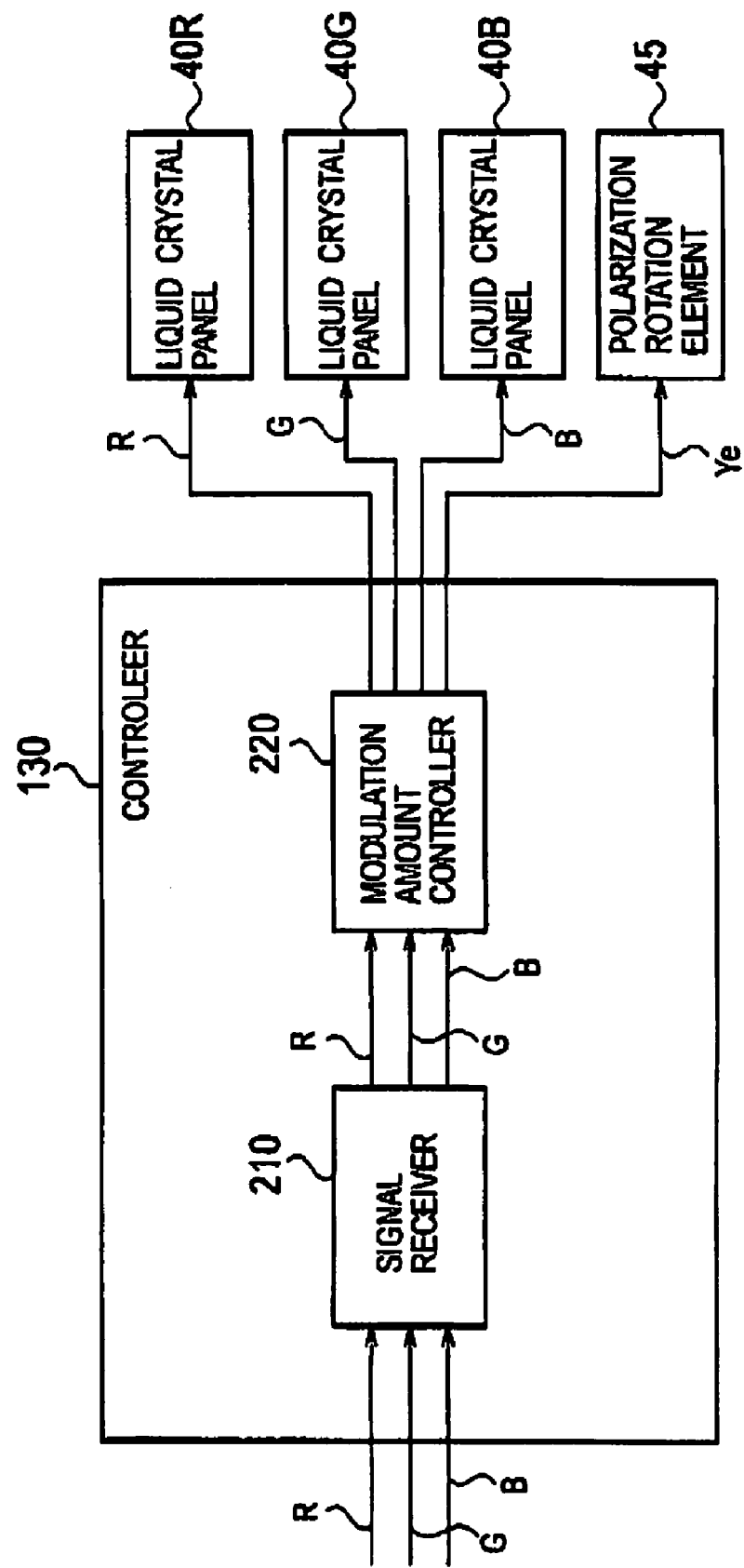
FIG. 9 is a block diagram showing functions of the projection display apparatus 100 according to the first embodiment.

Hereinafter, a description will be given of functions of the projection display apparatus according to the first embodiment with reference to drawings. FIG. 9 is a block diagram showing the functions of the projection display apparatus 100 according to the first embodiment.

As shown in FIG. 9, the projection display apparatus 100 includes a controller 130 having a signal receiver 210 and a modulation amount controller 220.

The signal receiver 210 is configured to receive color signals (input signals for red, green and blue). The signal receiver 210, for example, obtains the color signals from a color separation block, which separates color signals from an image signal.

The modulation amount controller 220 controls modulation amounts of the respective liquid crystal panels 40 (liquid crystal panels 40R, 40G and 40B) on the basis of the respective color signals obtained from the signal receiver 210. In addition, the modulation amount controller 220 controls, on the basis of the color signals received from the signal receiver 210, the rotation amount of a polarization direction of yellow component light, the rotation amount resulting from the rotation performed by the polarization rotation element 45.

Specifically, the modulation amount controller 220 generates an output signal for red in accordance with an input signal for red, and then inputs the output signal for red to the liquid crystal panel 40R. Likewise, the modulation amount controller 220 generates an output signal for green in accordance with an input signal for green, and then inputs the output signal for green to the liquid crystal panel 40G. Moreover, the modulation amount controller 220 generates an output signal for blue in accordance with an input signal for blue, and then inputs the output signal for blue to the liquid crystal panel 40B.

Here, the output signal for red color is preferably adjusted in accordance with the amount of yellow component light superposed on the red component light. Likewise, the output signal for green is preferably adjusted in accordance with the amount of yellow component light superposed on the green component light.

On the other hand, on the basis of the input signals for red, green and blue, the modulation amount controller 220 determines whether to disperse a yellow component light beam and then superpose the dispersed yellow component light beams on a red component light beam and a green component light beam (aforementioned pattern 1), to superpose the yellow component light beam only on the green component light beam (aforementioned pattern 2), or to superpose the yellow component light beam on only the red component light beam (aforementioned pattern 3).

In a case where the color purity of red color of an image to be displayed exceeds a predetermined threshold value $T_R$ and where the color purity of green color of the image to be displayed exceeds a predetermined threshold value $T_G$, for example, in order to reduce the amounts of respective red color and green color shifted towards the yellow color, the yellow component light is preferably dispersed and then superposed on the red component light and green component light. Accordingly, the modulation amount controller 220 controls the rotation amount of the polarization direction of yellow component light by a control signal that causes the yellow component light to be rotated at 469, for example.

In a case where the color purity of red color of an image to be displayed exceeds a predetermined threshold value $T_R$ and where the color purity of green color of the image to be displayed does not exceed a predetermined threshold value $T_G$, for example, in order to reduce the amount of red color shifted towards the yellow color, the yellow component light is preferably superposed only on the green component light. Accordingly, the modulation amount controller 220 controls the rotation amount of the polarization direction of the yellow component light by a control signal causing the yellow component light not to be rotated, for example.

In a case where the color purity of green color of an image to be displayed exceeds a predetermined threshold value $T_G$ and where the color purity of red color of the image to be displayed does not exceed a predetermined threshold value $T_R$, for example, in order to reduce the amount of green color shifted towards the yellow color, the yellow component light is preferably superposed only on the red component light. Accordingly, the modulation amount controller 220 controls the rotation amount of the polarization direction of the yellow component light by a control signal causing the yellow component light to be rotated at 90°, for example.

The output signals for red and green and the control signal (the rotation amount of the yellow component light) are preferably adjusted in accordance with a color reproduction range of the image to be displayed.

(Effects and Advantages)

In the case of the projection display apparatus 100 according to the first embodiment, yellow component light (the fourth color component light) outputted from the polarization rotation element 45 enters any one of or both of the liquid crystal panels 40R and 40G. In other words, the yellow component light is superposed on any one of or both of red component light and green component light, and then supplied to the cross dichroic cube 50. Accordingly, in a case where yellow component light is utilized in addition to red component light, green component light and blue component light, the types of light beams that enter the cross dichroic cube 50 are three types. As a result of this, the design of the projection lens unit 110 does not need to be changed. It is thus possible to suppress an increase of entire costs for the apparatus.

Moreover, since yellow component light is superposed on one of red component light and green component light, and then is supplied to the cross dichroic cube 50, the luminance of an image projected on the screen 200 by the projection lens unit 110 improves.

In the case of the projection display apparatus 100 according to the first embodiment, the separation optical element 80 combines a red component light beam transmitted through the dichroic surface 81 with a yellow component light beam reflected by the PBS surface 82, and then leads the combined light beam towards the liquid crystal panel 40R. Moreover, the separation optical element 80 combines a green component light beam reflected by the dichroic surface 81 with a yellow component light beam transmitted through the PBS surface 82 and guides the combined light beam towards the liquid crystal panel 40G. Furthermore, the polarization rotation element 45 rotates the polarization direction of the yellow component light whose polarization direction has been aligned.

Accordingly, it is possible to switch selectively from one another whether to disperse a yellow component light beam and then superpose the dispersed yellow component light beams on a red component light beam and a green component light (pattern 1), to superpose the yellow component light beam only on the green component light beam pattern 2), or to superpose the yellow component light beam only on the red component light beam (pattern 3).

Thereby, an improvement in the luminance of white color reproduced by the component light of four colors can be achieved while maintaining the color purities of red color and green color reproduced by the component light of the four colors of red component light, green component light, blue component light and yellow component light.

In the case of the projection display apparatus 100 according to the first embodiment, the modulation amount controller 220 controls, on the basis of input signals for red, green and blue, the rotation amount of a polarization direction of yellow component light, the rotation amount resulting from the rotation performed by the polarization rotation element 45. Thus, one of aforementioned three patterns 1 to 3 can be appropriately selected.

In the case of the projection display apparatus 100 according to the first embodiment, the polarization rotation element 46 aligns the polarization direction (P polarization direction) of red component light transmitted through the separation optical element 80, and the polarization direction (S polarization direction) of yellow component light reflected by the separation optical element 80. Accordingly, the polarizing plate 41R provided on the light incident surface of the liquid crystal panel 40R efficiently transmits the yellow component light. The luminance of an image projected on the screen 200 by the projection lens unit 110 thus can be improved.

Second Embodiment

Hereinafter, a description will be given of a second embodiment with reference to drawings. In the following, the description will be mainly given to denote differences between the above-mentioned first embodiment and the second embodiment.

Specifically, in the aforementioned first embodiment, yellow component light is first separated from red component light, green component light and blue component light, and then enters the separation optical element.

In contrast to this, in the second embodiment, yellow component light enters the separation optical element with red component light and green component light. It should be noted that two separation optical elements are used in the second embodiment because of this difference.

(Schematic Configuration of Illumination Unit)

Figure 10:
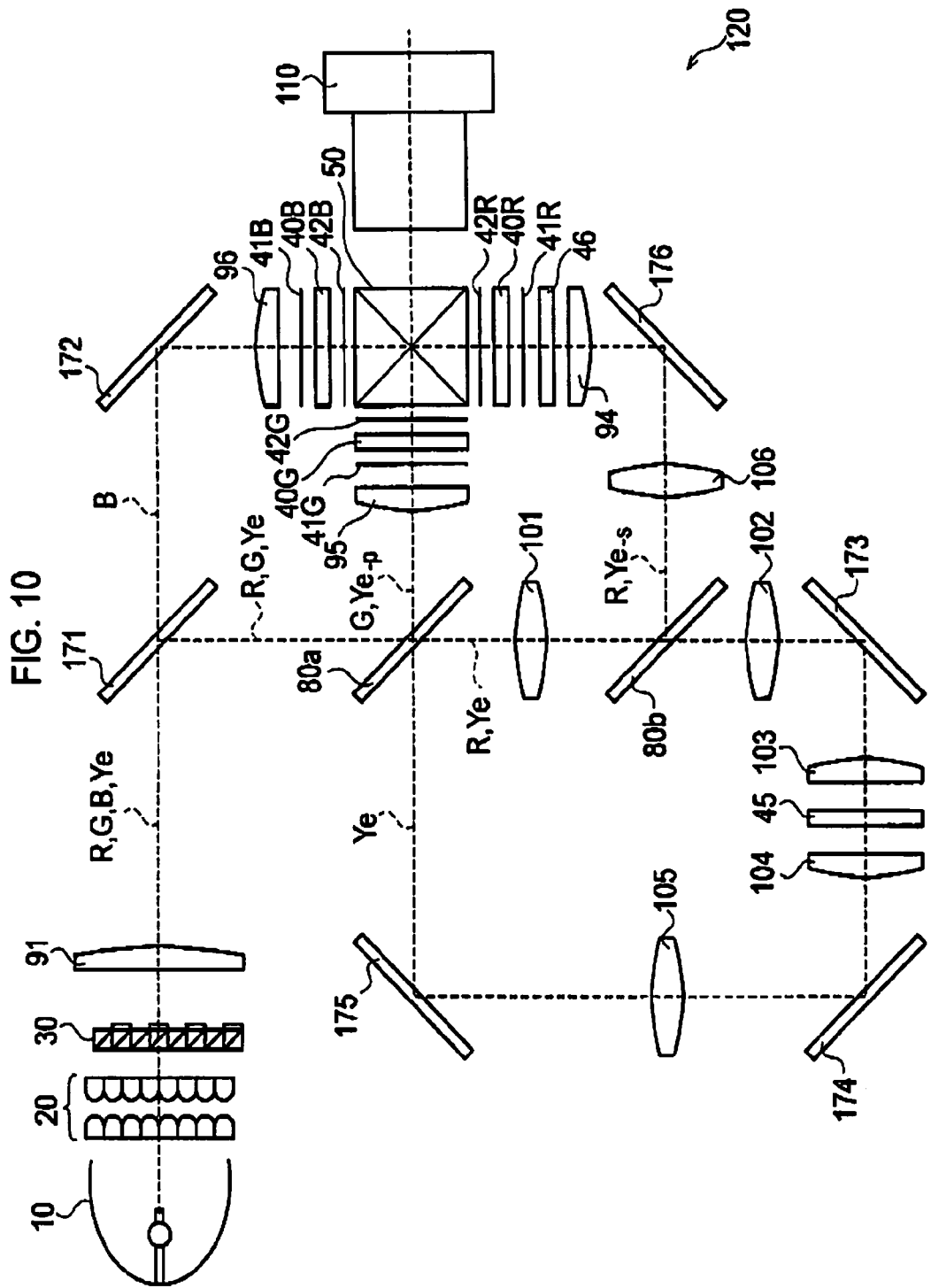
FIG. 10 is a diagram showing a schematic configuration of an illumination unit 120 according to a second embodiment.

Hereinafter, a description will be given of a schematic configuration of an illumination unit according to the second embodiment with reference to drawings. FIG. 10 is a diagram showing the schematic configuration of an illumination unit 120 according to the second embodiment. It should be noted that the same reference numerals are used to denote components that are the same as those in aforementioned first embodiment.

As shown in FIG. 10, the illumination unit 120 includes a plurality of mirrors (mirrors 171 to 176), a separation optical element 80a, a separation optical element 80b, and a plurality of lenses (lens 91, lenses 94 to 96 and lenses 101 to 106).

The mirror 171 is a dichroic mirror configured to reflect red component light, green component light and yellow component light and to transmit blue component light. Mirror 172 is a reflection mirror configured to reflect blue component light and then to lead the light towards the liquid crystal panel 40B. The mirror 173 is a reflection mirror configured to reflect the yellow component light transmitted through the separation optical element 80a and separation optical element 80b, and then to lead the light towards the polarization rotation element 45. The mirrors 174 and 175 are reflection mirrors each configured to reflect the yellow component light whose polarization direction is rotated by the polarization rotation element 45, and leads the light towards the separation optical element 80a. The mirror 176 is a reflection mirror configured to reflect the red component light transmitted through the separation optical element 80a and then reflected by the separation optical element 80b and the yellow component light reflected by the separation optical element 80a and the separation optical element 80b, and then to lead the light beams towards the liquid crystal panel 40R.

Figure 11A:
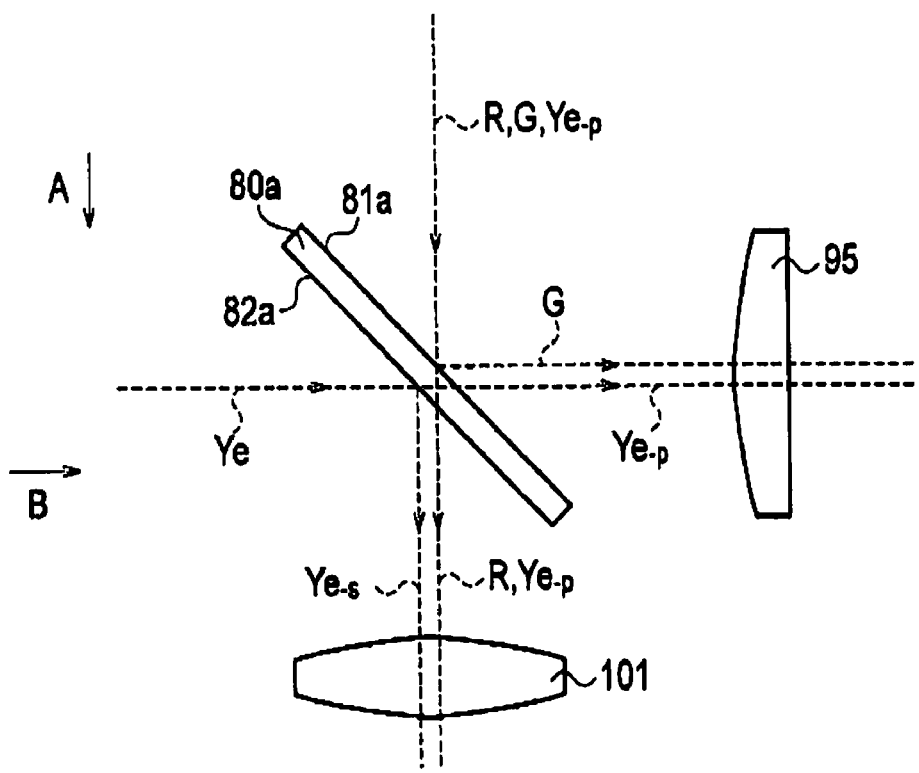
FIGS. 11A and 11B are diagrams showing a configuration of a separation optical element according to the second embodiment.

As shown in FIG. 11A, the separation optical element 80a is a plate-like element including a dichroic surface 81a and a PBS surface 82a formed thereon. The dichroic surface 81a reflects green component light and transmits red component light and yellow component light. The PBS surface 82a transmits P polarization component light and reflects S polarization component light.

Red component light, green component light and yellow component light each having P polarization direction enters the separation optical element 80a from a certain direction (direction A in FIG. 11A). Yellow component light whose polarization direction has been rotated by the polarization rotation element 45 enters the separation optical element 80a from a different direction (direction B in FIG. 11A).

Accordingly, the green component light entering from direction A is reflected by the dichroic surface 81a and is then led towards the lens 95 (towards liquid crystal panel 40G). On the other hand, the red component light and yellow component light (P polarization component light) entering from direction A are transmitted through the dichroic surface 81a and the PBS surface 82a, and are then led towards the lens 101 (towards the separation optical element 80b).

Among the yellow component light beams entering from direction B, a yellow component light beam having a P polarization direction (Ye-$_P$) is transmitted through the PBS surface 82a and the dichroic surface 81a, and then is led towards the lens 95 (towards the liquid crystal panel 40G). On the other hand, among the yellow component light beams entering from direction B, a yellow component light beam having S polarization direction (Ye-$_S$) is reflected by the PBS surface 82a, and then is led towards the lens 101 (towards the separation optical element 80b).

Specifically, the separation optical element 80a combines the green component light entering from direction A and reflected by the dichroic surface 81a with the yellow component light (Ye-$_P$) entering from direction B and transmitted through the PBS surface 82a. The separation optical element 81a then leads the combined light beam towards the lens 95 (towards the liquid crystal panel 40G). On the other hand, the separation optical element 80a combines the red component light entering from direction A and transmitted through the dichroic surface 81a with the yellow component light (Ye-$_S$) entering from direction B and reflected by the PBS surface 82a. The separation optical element 81a then leads the combined light beam towards the lens 101 (towards the separation optical element 80b). Here, it should be noted that the separation optical element 80a as well leads the yellow component light entering from direction A and transmitted through the dichroic surface 81a towards the lens 101 (towards the separation optical element 80b).

Figure 11B:
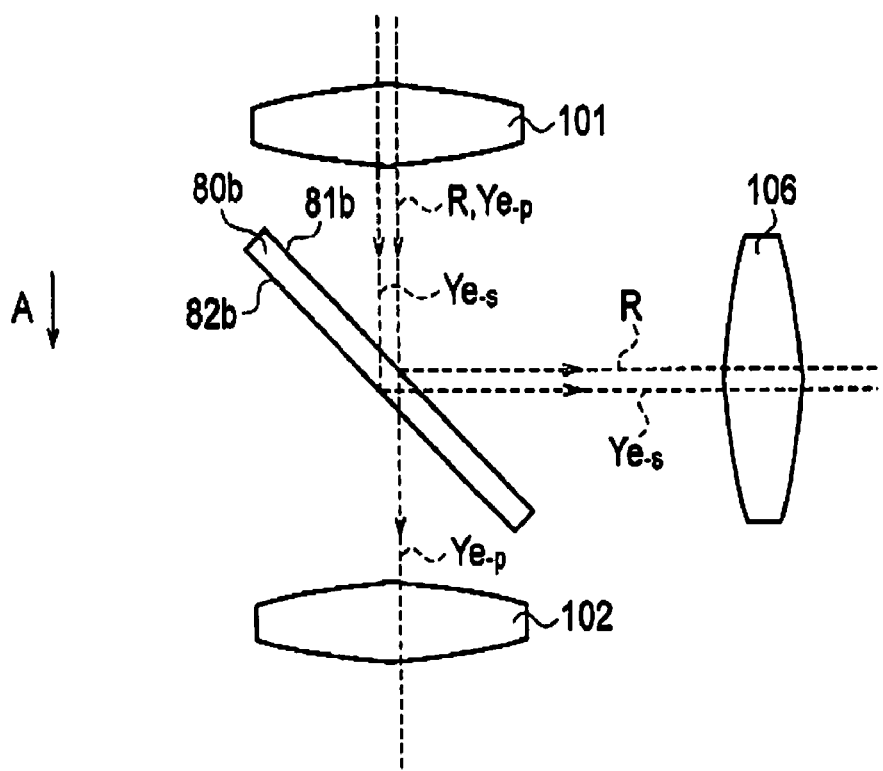

As shown in FIG. 11B, the separation optical element 80b is a plate-like element including a dichroic surface 81b and a PBS surface 82b formed thereon. The dichroic surface 81b is configured to reflect red component light and to transmit yellow component light. The PBS surface 82b transmits P polarization component light and reflects S polarization component light.

The red component light and yellow component light (P polarization component light) transmitted through the separation optical element 80a enters the separation optical element 80b from a certain direction (direction A in FIG. 11B). The yellow component light (S polarization component light) reflected by the separation optical element 80a enters the separation optical element 80b from the certain direction (direction A in FIG. 11B).

Accordingly, the red component light transmitted through the separation optical element 80a is reflected by the dichroic surface 81b and is led towards the lens 106 (the liquid crystal panel 40R). The yellow component light (S polarization component light) reflected by the separation optical element 80a is reflected by the PBS surface 82b and is led towards the lens 106 (the liquid crystal panel 40R). On the other hand, the yellow component light (P polarization component light) transmitted through the separation optical element 80a is transmitted through the dichroic surface 81b and the PBS surface 82b and then is led towards the lens 102 (the polarization rotation element 45).

Specifically, the separation optical element 80b combines the red component light transmitted through the separation optical element 80a with the yellow component light (Ye-$_S$) reflected by the separation optical element 80a. The separation optical element 80b then leads the combined light beam towards the lens 106 (liquid crystal panel 40R). On the other hand, the separation optical element 80b transmits the yellow component light (Ye-$_P$) transmitted through the separation optical element 80a and then leads the light towards the lens 102 (towards the polarization rotation element 45).

The lenses 91, 94 to 96 are condenser lenses that condense light emitted from the light source 10 for each of the liquid crystal panels 40. The lenses 101 to 106 are relay lenses provided for adjusting differences of optical path lengths of the respective color component light beams.

Here, it should be noted that the polarization rotation element 46 may be provided on an optical path of the red component light including yellow component light superposed thereon, the optical path being anywhere from the separation optical element 80b till the liquid crystal panel 40R.

In the second embodiment, among the yellow component light beams whose polarization directions have been rotated by the polarization rotation element 45, a yellow component light beam having a P polarization direction (Ye-$_P$) is transmitted through the separation optical element 80a and is then led towards the liquid crystal panel 40G. On the other hand, among the yellow component light beams whose polarization directions have been rotated by the polarization rotation element 45, a yellow component light beam having a S polarization direction (Ye-$_S$) is reflected by the separation optical element 80b and is then led towards the liquid crystal panel 40R. Accordingly, it should be noted that yellow component light undergoes a loop optical system (from the separation optical element 80b till the separation optical element 80a through the polarization rotation element 45) only once.

(Effects and Advantages)

In the case of the projection display apparatus 100 according to the second embodiment, by combining the separation optical element 80a and the separation optical element 80b, the same effects as those in the case of the first embodiment can be obtained. Moreover, the flexibility in designing the apparatus as to arrangement relationships of the optical elements and the like improves.

Other Embodiments

Although the present invention has been described by the above-mentioned embodiments, the descriptions and drawings that constitute a part of this disclosure should not be understood as to limit the scope of the present invention. For those who are skilled in the art, various alternative embodiments, examples, and operating techniques will be apparent from this disclosure.

The fourth color component light is yellow component light in aforementioned embodiments. The present invention is not limited to this, however. The fourth color component light may be cyan component light, magenta component light or the like. Specifically, the projection display apparatus 100 preferably switches from one another selectively whether to diffuse cyan component light and then superpose the diffused cyan component light on green component light and blue component light, to superpose the cyan component light only on the green component light, or to superpose the cyan component light only on the blue component light. In addition, the projection display apparatus 100 preferably switches from one another selectively whether to diffuse magenta component light and then superpose the diffused magenta component light on red component light and blue component light, to superpose the magenta component light only on the red component light, or to superpose the magenta component light only on the blue component light.

The fourth color component light is component light of a single color in aforementioned embodiments. The present invention is not limited to this however. The fourth color component light may be component light of a plurality of colors.

In aforementioned embodiments, an assumption is made that the fourth light valve is the polarization rotation element 45 not having a resolution. The present invention is not limited to this, however. Specifically, the fourth light valve may be a liquid crystal panel for the fourth color having a resolution. In this case, the resolution of the liquid crystal panel for the fourth color is preferably lower than that of each of the liquid crystal panels 40R, 40G and 40B. It should be noted, however, that the resolution of the liquid crystal panel for the fourth color may be one that is equal to that of each of the liquid crystal panels 40R, 40G and 40B.

In aforementioned embodiments, the element rotating a polarization direction of yellow component light is the polarization rotation element 45 of transmissive type. The present invention is not limited to this, however. Specifically, the element rotating a polarization direction of yellow component light may be a polarization rotation element of reflective type (LCOS, for example).

In aforementioned embodiments, the polarization rotation element 46 aligns polarization directions of red component light and yellow component light to be in P polarization direction by rotating the polarization direction of the yellow component light. The present invention is not limited to this, however. Specifically, in a case where the polarizing plate 41R provided on a light-entering side of the liquid crystal panel 40R transmits S polarization component light, the polarization rotation element 46 may align the polarization directions of the red component light and the yellow component light to be in S polarization direction by rotating the polarization direction of the red component light.

The positional relationship of the dichroic surface 81 and the PBS surface 82 may be reversed. The positional relationship of the separation optical element 80a and the separation optical element 80b may be reversed as well, as a matter of course.

In aforementioned embodiments, the polarization separation surface that transmits polarization component light having a certain polarization direction and that reflects polarization component light of a different polarization direction perpendicular to the certain polarization direction is a PBS surface. The present invention is not limited to this, however. Specifically, the polarization separation surface may be a polarization separation surface of Wire Grid type that transmits S polarization component light and that reflects P polarization component light. It should be noted that the separation optical element 80 leads yellow component light (Ye-$_S$) towards the liquid crystal panel 40G, and also leads yellow component light (Ye-$_P$) towards the liquid crystal panel 40R in this case.

What is claimed is:

1. An illumination apparatus provided with a first polarization conversion element configured to align polarization directions of first color component light, second color component light, third color component light and fourth color component light; a first light valve configured to modulate the first color component light; a second light valve configured to modulate at least the second color component light; a third light valve configured to modulate at least the third color component light; a fourth light valve configured to rotate a polarization direction of the fourth color component light; and a color combining unit configured to combine the first color component light outputted from the first light valve, output light including at least the second color component light outputted from the second light valve, and output light including at least the third color component light outputted from the third light valve, comprising:

a first separation optical element of plate-like shape in which a first dichroic surface and a first polarization separation surface are formed, the first dichroic surface is configured to reflect the second color component light and to transmit the third color component light, and the first polarization separation surface is configured to transmit polarization component light of a certain polarization direction and to reflect polarization component light of a different polarization direction perpendicular to the certain polarization direction, wherein the second color component light and the third color component light, the polarization directions of which have been aligned by the first polarization conversion element, enter the first separation optical element from a certain direction, and the fourth color component light, the polarization direction of which has been rotated by the fourth light valve, enters the first separation optical element from a different direction, the first separation optical element combines the third color component light entering the first dichroic surface from the certain direction and transmitted through the first dichroic surface, with the fourth component light entering the first polarization separation surface from the different direction and reflected by the first polarization separation surface, and leads a combined light towards the third light valve, and the first separation optical element combines the second color component light entering the first dichroic surface from the certain direction and reflected by the first dichroic surface with the fourth color component light entering the first polarization separation surface from the different direction and transmitted through the first polarization separation surface, and leads a combined light towards the second light valve.

2. The illumination apparatus according to claim 1, further comprising:

a second separation optical element of plate-like shape in which a second dichroic surface and a second polarization separation surface are formed, the second dichroic surface is configured to reflect the third color component light and to transmit the fourth color component light, and the second polarization surface is configured to transmit polarization component light of the certain polarization direction and to reflect polarization component light of the different polarization direction, wherein the fourth color component light from the certain direction enters the first separation optical element in addition to the second color component light and the third color component light, the second separation optical element transmits the fourth color component light transmitted through the first separation optical element and leads the fourth color component light towards the fourth light valve, and the second separation optical element reflects the third color component light transmitted through the first separation optical element and the fourth color component light reflected by the first separation optical element, and leads the third component light and the fourth component light towards the third light valve.

3. The illumination apparatus according to claim 1, further comprising:

a second polarization conversion element configured to align a polarization direction of the third color component light transmitted through the first dichroic surface and a polarization direction of the fourth color component light reflected by the first polarization separation surface.

4. The illumination apparatus according to claim 1, wherein a resolution of the fourth light valve is lower than a resolution of each of the first, second and third light valves.

5. The illumination apparatus according to claim 1, further comprising:

a rotation amount controller configured to control a rotation amount of the polarization direction of the fourth color component light rotated by the fourth light valve, on the basis of input signals for first, second, and third colors respectively corresponding to the first color component light, the second color component light and the third color component light, the rotation being performed by the fourth light valve.

6. A projection display apparatus comprising any one of the illumination apparatuses according to claims 1 to 5.

* * * * *